(12) United States Patent
Harrison et al.

(10) Patent No.: US 7,584,539 B2
(45) Date of Patent: Sep. 8, 2009

(54) ELECTROPOLISHING OF INKJET PRINTER COMPONENTS

(75) Inventors: James E. Harrison, New Lebanon, OH (US); Francis T. Galbraith, Beavercreek, OH (US); Kevin P. Egan, Tipp City, OH (US); Bruce A. Bowling, Beavercreek, OH (US); Richard W. Sexton, Bainbridge, OH (US)

(73) Assignee: Eastman Kodak Company, Rochester, NY (US)

( * ) Notice: Subject to any disclaimer, the term of this patent is extended or adjusted under 35 U.S.C. 154(b) by 156 days.

(21) Appl. No.: 11/549,710

(22) Filed: Oct. 16, 2006

(65) Prior Publication Data

US 2008/0088681 A1   Apr. 17, 2008

(51) Int. Cl.
*B23P 17/00* (2006.01)
*B41J 2/14* (2006.01)

(52) U.S. Cl. .................... 29/890.1; 29/25.35; 29/25.42; 29/831; 29/832; 29/835; 205/680; 347/47; 347/67

(58) Field of Classification Search ................ 29/890.1, 29/830, 831, 832, 25.35, 25.42; 205/640, 205/670, 671, 48, 50, 124, 687, 83, 126; 347/68–71, 85, 84, 95, 93, 46
See application file for complete search history.

(56) References Cited

U.S. PATENT DOCUMENTS 4,453,171 A * 6/1984 Bernier et al. .............. 347/165
4,488,684 A * 12/1984 Ebert et al. .................. 239/222
4,935,865 A    6/1990 Rowe et al.
4,999,644 A    3/1991 Katerberg et al.
5,406,318 A * 4/1995 Moore et al. .................. 347/70
6,150,279 A * 11/2000 Ku .............................. 438/707

FOREIGN PATENT DOCUMENTS

EP    0 854 040    3/2003
EP    1 013 422    8/2006

OTHER PUBLICATIONS

Katerberg, James A., Method fro providing particle-free ink jet printer components, Jul. 22, 1998, Bulletin 1998/30.*

* cited by examiner

*Primary Examiner*—Minh Trinh
*Assistant Examiner*—Tai Nguyen
(74) *Attorney, Agent, or Firm*—William R. Zimmerli

(57) ABSTRACT

A method of manufacturing an inkjet printer component and an inkjet printer component electropolishing device are provided. The method includes positioning an electrode in a fluid passageway of an inkjet printer component, the electrode including a conductive face and a nonconductive face; polishing a side of the fluid passageway by: biasing the nonconductive face of the electrode toward a side of the fluid passageway such that the conductive face of the electrode does not contact any portion of the fluid passageway; providing an electrolytic fluid to the fluid passageway of the inkjet printer component; and applying a voltage between the electrode and the inkjet printer component.

4 Claims, 6 Drawing Sheets

ELECTROPOLISHING OF INKJET PRINTER COMPONENTS

FIELD OF THE INVENTION

The present invention relates generally to inkjet printing and, in particular to a method of manufacturing inkjet printer components.

BACKGROUND OF THE INVENTION

Electropolishing of inkjet printer components is known, see, for example, European Patent Application Publication EP 0 854 040 A2, published on Jul. 22, 1998, and is used to remove burrs, EDM splatter, flakes, etc. produced during the manufacturing processes used to fabricate these components.

Referring to FIG. 1, EP 0 854 040 A2 discloses an electropolishing process in which an electrode 10 are positioned inside a fluid cavity 12, commonly referred to as a bore, of a drop generator body 14. Typically, electrode 10 is a wire or small diameter rod and is secured in place with a fixture (not shown) at both ends of drop generator body 14. Drop generator body 14 along with electrode 10 is then immersed in an electropolishing solution and an appropriate voltage applied between drop generator body 14 and electrode 10 to affect electropolishing of the inkjet printer component.

While positioning internal electrode 10 within fluid cavity 12 of drop generator body 14 can be accomplished relatively easily, placement of an electrode in fluid passageway 16, commonly referred to as a slot, has been problematic. Fluid passageway 16 is sufficiently narrow, for example, approximately 0.015 inches wide in some drop generator bodies, that the risk of accidental contact between electrode 10 and drop generator body 14 becomes significant. Any such contact occurring during the electropolishing process can produce an electrical short and arcing that will destroy the drop generator.

Additionally, a gap between electrode 10 and the walls of the slot must be sufficiently large to allow electrolytic fluid to flow through the gap between the walls of fluid passageway 16 and electrode 10. It is difficult to accomplish this without significantly increasing the risk of electrode 10 contacting drop generator body 14. Also, fluid passageway 16 does not extend to the ends of the drop generator body 14. As such, fixtures located at the ends of fluid passageway 14 can not be used to retain electrode 10 in position within fluid passageway 16.

Accordingly, EP 0 854 040 A2 discloses a pulsing technique in which the electropolishing solution is pulsed in order to electropolish regions of the inkjet printer component, like fluid passageway 16, that can not accommodate electrode 10. However, it has been found that using the pulsing technique can produce inconsistent results depending on the characteristics and dimensions of fluid passageway 16.

Accordingly, a need exists to be able to electropolish inkjet printer components that traditionally are unable to accommodate positioning of an electrode within the component.

SUMMARY OF THE INVENTION

According to a feature of the present invention, a method of manufacturing an inkjet printer component, the inkjet printer component including a fluid passageway, the method including positioning an electrode in the fluid passageway of the inkjet printer component, the electrode including a conductive face and a nonconductive face; polishing a side of the fluid passageway by: biasing the nonconductive face of the electrode toward a side of the fluid passageway such that the conductive face of the electrode does not contact any portion of the fluid passageway; providing an electrolytic fluid to the fluid passageway of the inkjet printer component; and applying a voltage between the electrode and the inkjet printer component.

According to another feature of the present invention, an inkjet printer component electropolishing device includes an electrode including a nonconductive face and a conductive face. The conductive face of the electrode is at least partially bounded by a nonconductive material such that a conductive window is located on the conductive face of the electrode.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

EP 0 854 040 A2 also discusses electrochemical polishing (commonly referred to as electropolishing) and electrochemical deburring as two electrochemical methods for removing burrs, splatter, flakes, etc. from machined inkjet printer components. Typically, these processes differ in the types of electrolytic fluids used. Appropriate electrolytic fluids for use in these processes are well known in the electropolishing and electrochemical deburring industries. These methods and associated electrolytic fluids are interchangeable within the context of the present invention.

Figure 1:
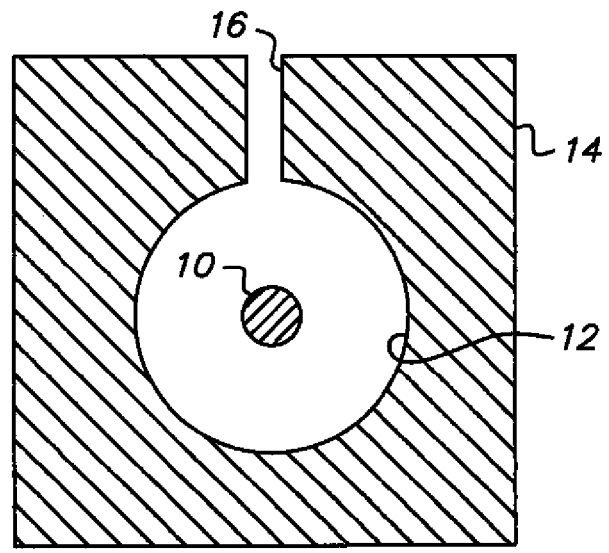
FIG. 1 is a schematic illustration of a prior art method of manufacturing an inkjet printer component.
Figure 2:
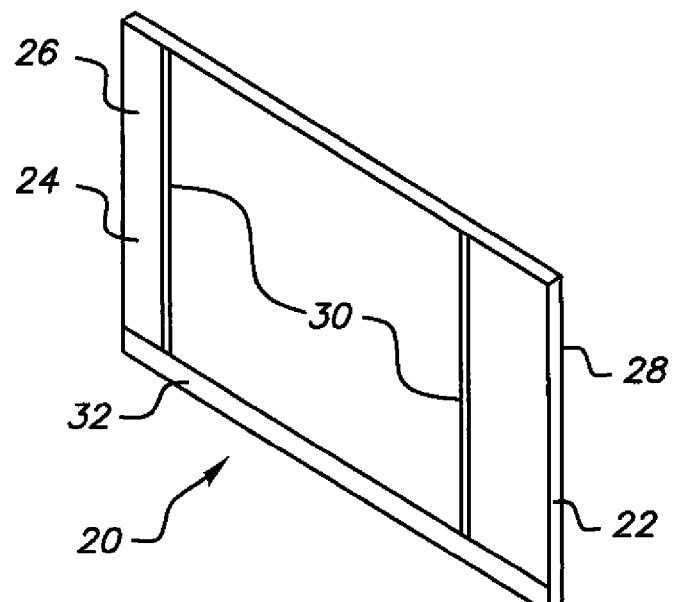
FIG. 2 is a schematic illustration of an example embodiment of an electrode component of the present invention.

Referring to FIG. 2, a schematic illustration of an example embodiment of an electrode 20 component of the present invention is shown. Electrode 20 is a single sided electrode. As electrode 20 is electrically conductive on only one side, the likelihood of electrode 20 contacting the inkjet printer component and causing arcing during the polishing process is reduced. As shown in FIG. 2, single sided electrode 20 includes a thin nonconductive ceramic plate 22 with a thin conductive coating or layer 24 over one face 26 of the two faces 26, 28 of electrode 20. Conductive layer 24 can include a metal coating, such as gold, that is deposited on ceramic plate 22 using conventional methods such as sputtering or other types of vacuum deposition. When other materials are used, the material selected for conductive layer 24 should be sufficiently conductive to ensure uniform electropolishing across a width of electrode 20. Electrode 20 can also include a non-conductive region 32 on face 26 by not coating all of face 26 with conductive layer 24.

Electrode 20 includes a plurality of dielectric shields 30 positioned on face 26 to cover portions of conductive layer. Dielectric shields 30 can be in the form of narrow non-conductive tape strips, fine polymeric or glass fibers, or a photoresist material. Dielectric shields 30 serve as spacers to prevent accidental contact between conductive layer 24 of face 26 and one or more of the sides of the fluid passageway side of the inkjet printer component.

During electropolishing of the inkjet printer component, single sided electrode 20 can be positioned in the fluid passageway of the component with non-conductive face 28 in contact with one of the sides of the fluid passageway without risk of electrode 20 making electrical contact with that side of the fluid passageway. A biasing or retaining fixture can be used to locate single sided electrode 20 in the fluid passageway with non-conductive face 28 in contact with a side of the fluid passageway. With single sided electrode 20 biased or retained in position with non-conductive face 28 in contact with the side of the fluid passageway, the gap between conductive face 26 of electrode 20 and the side of the fluid passageway to be electropolished is wide enough to allow electrolytic fluid to flow through the gap thus allowing electropolishing to occur when a voltage is applied to electrode 20 and an inkjet printer component 52, for example, drop generator body 54 (shown in FIG. 5).

The specific voltage applied to electrode 20 and inkjet printer component 52 can be any voltage that is sufficient to cause electropolishing of inkjet printer component 52 but does not cause pitting of inkjet printer component 52. Typically, the specific applied voltage will depend on the composition of the electrolytic fluid used in the electropolishing process. The electrolytic fluids used in the electropolishing process can be, for example, the electrolytic fluids discussed above with reference to EP 0 854 040 A2. However, other types of electrolytic fluids can be used.

Using single sided electrode 20, it is now possible to effectively electropolish a side of the fluid passageway. After a first side of the fluid passageway is completely electropolished, electrode 20 can be turned around and repositioned in the fluid passageway such that a second side of the fluid passageway can be electropolished.

When dielectric shields 30 are included on electrode 20, portions of the fluid passageway of the inkjet printer component can be masked leaving those portions un-electropolished. As such, the fluid passageway can be polished in one or more steps. In this situation, electropolishing takes place with electrode 20 in one positions within the fluid passageway. Then, electrode 20 is indexed along the length of fluid passageway such that dielectric shields 30 no longer mask the same portion of the fluid passageway when compared to the previous step. Electropolishing then takes place after electrode 20 has been repositioned or indexed along the length of the fluid passageway. Indexing of electrode 20 can be accomplished manually by an operator or automatically. Additionally, indexing of electrode 20 can be a discrete step or alternatively electrode 20 can be continuously moved back and forth along the length of fluid passageway.

Figure 3:
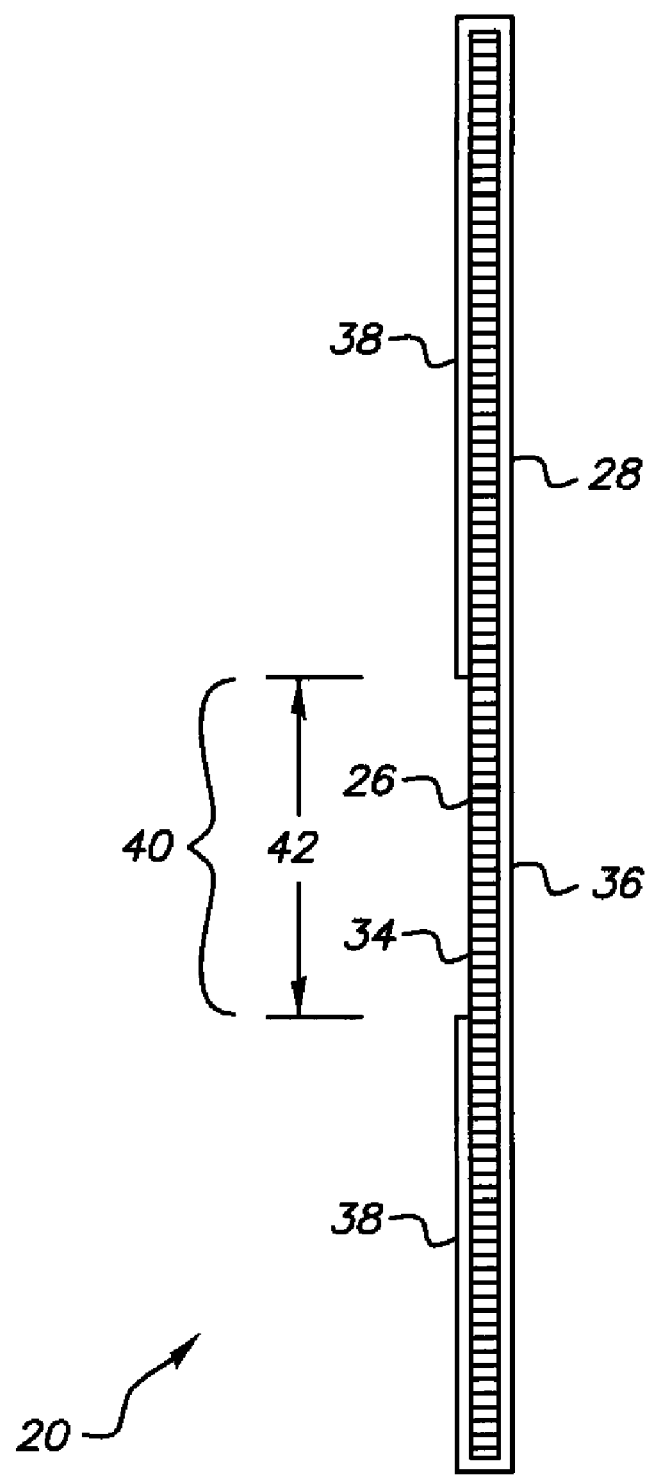
FIG. 3 is a schematic illustration of another example embodiment of an electrode component of the present invention.

Referring to FIG. 3, a schematic illustration of another example embodiment of electrode 20 is shown. Single sided electrode 20 includes a conductive face 26 made from a conductive material 34, for example, a copper or beryllium copper foil, and a nonconductive face 28 made from a nonconductive material 36, for example, a polymeric sheet, laminated to one side of conductive material 34. Polyimide materials such as Kapton or Upilex are suitable non-conductive polymeric sheet materials. As shown in FIG. 3, conductive face 26 is partially covered by a nonconductive material 38, for example, a polymeric sheet like the one described above, such that a polishing or conductive window 40 is formed. The height 42 of polishing or conductive window can be designed to align with the height 43 of the wall or side of the fluid passageway to be electropolished. This further reduces the likelihood of electrical arcing when voltage is applied to electrode 20 and helps to concentrate or direct electropolishing to the side wall of the fluid passageway.

Figure 4:
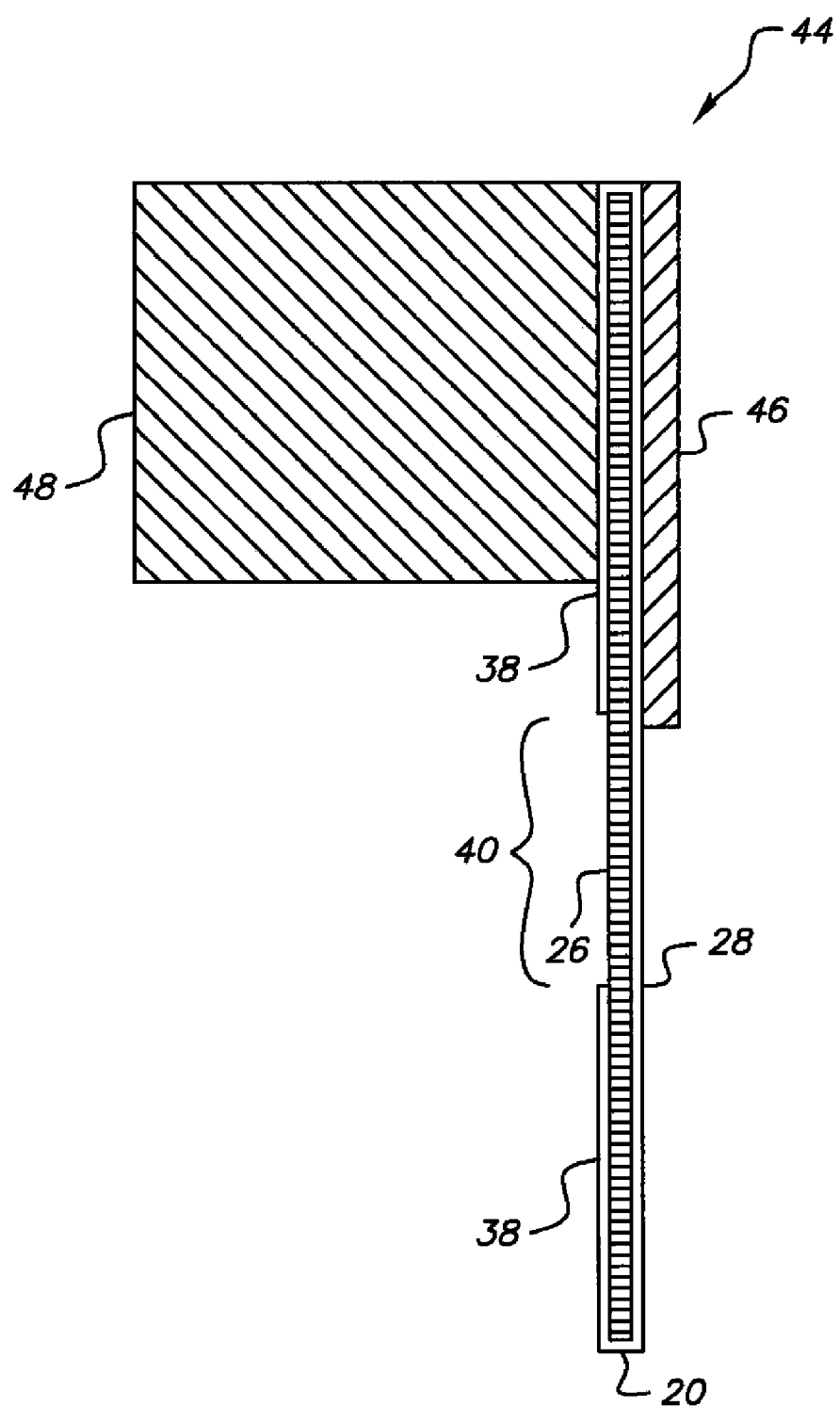
FIG. 4 is a schematic illustration of the electrode component of FIG. 3 shown in an electrode fixture.

Referring to FIG. 4, a schematic illustration of electrode 20 is shown mounted to an electrode fixture. Electrode 20 is positioned within the fluid passageway using fixture 44. Fixture 44 helps to locate and bias electrode 20 in the fluid passageway so that the insulated or nonconductive face 28 of electrode 20 is closer to a wall or side of the fluid passageway than the un-insulated or conductive face 26 of electrode 20. A plate 46, for example, a Macor® ceramic material plate, of fixture 44 secures at least one end of single sided electrode 20 to a conventional electrode mounting block 48 of fixture 44.

Figure 5:
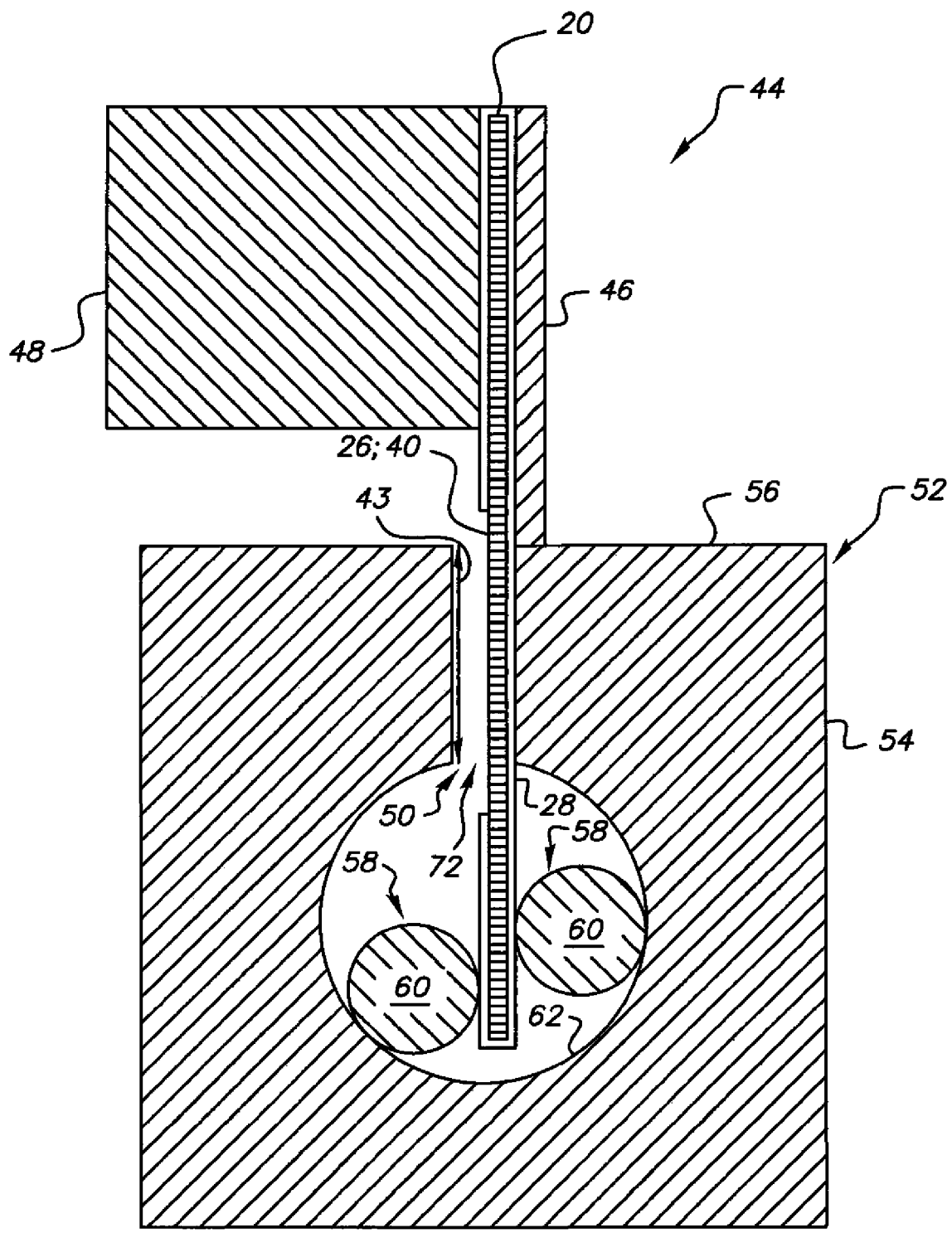
FIG. 5 is a schematic illustration of the electrode fixture of FIG. 3 positioned in an inkjet printer component.

Referring to FIG. 5, a schematic illustration of electrode 20 positioned in a fluid passageway 50 of an inkjet printer component 52, for example, a drop generator body 54, is shown. Plate 46 rests on a surface 56 of drop generator body 54 so as to control the depth of insertion of electrode 20 into fluid passageway 50 of drop generator body 54.

Electrode guides 58 can be used to bias or stabilize another end of electrode 20 within drop generator body 54. Electrode guides 58 can be at least one nonconductive, for example, plastic, rod 60 positioned in a fluid cavity 62 of drop generator body 54 and located on the each side of electrode 20 such that the inserted end of electrode 20 is stabilized and appropriately positioned within inkjet printer component 52. Drop generator body 54 can be, for example, of the type disclosed in U.S. Pat. No. 4,999,644, issued to Katerberg et al. on Mar. 12, 1991, or in European Patent No. EP 1 013 422 B1, published on Aug. 23, 2006.

Figure 6:
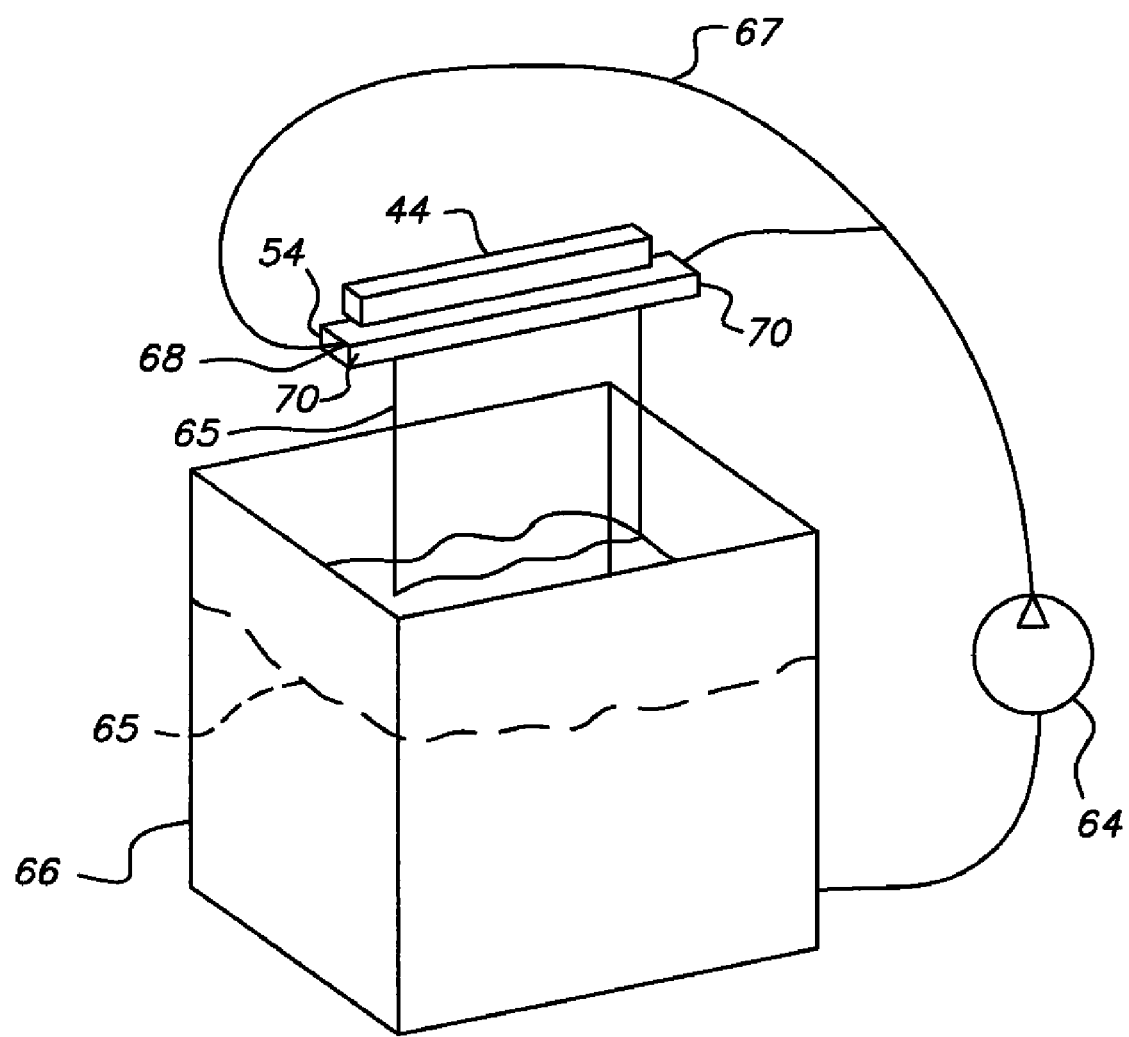
FIG. 6 is a schematic illustration of an example embodiment of the present invention.

Referring to FIG. 6, a schematic illustration of an example embodiment of the present invention is shown. In this embodiment, electrolytic fluid is actively flowed between electrode 20 and the side of fluid passageway being polished. A pump 64 pumps electrolytic fluid 65 from a reservoir 66 through supply lines 67 into drop generator body 54. Electrolytic fluid 65 enters drop generator body though inlet ports 68 located at each end 70 of drop generator body 54. Inlet ports 68 are connected to fluid cavity 62 of drop generator body 54. Electrolytic fluid 65 flows past plastic rods 60 located in fluid cavity 62 and flows out of drop generator body 54 through the gap 72 (shown in FIG. 5) between electrode 20 and the wall or side of fluid passageway 50 being electropolished. After exiting fluid passageway 50, electrolytic fluid 65 flows over the sides of drop generator body 54 and drips back into reservoir 66. A power supply (like the one shown in FIG. 7) is used to establish the voltage between electrode 20 and drop generator body 54 needed for electropolishing fluid passageway 50.

Figure 7:
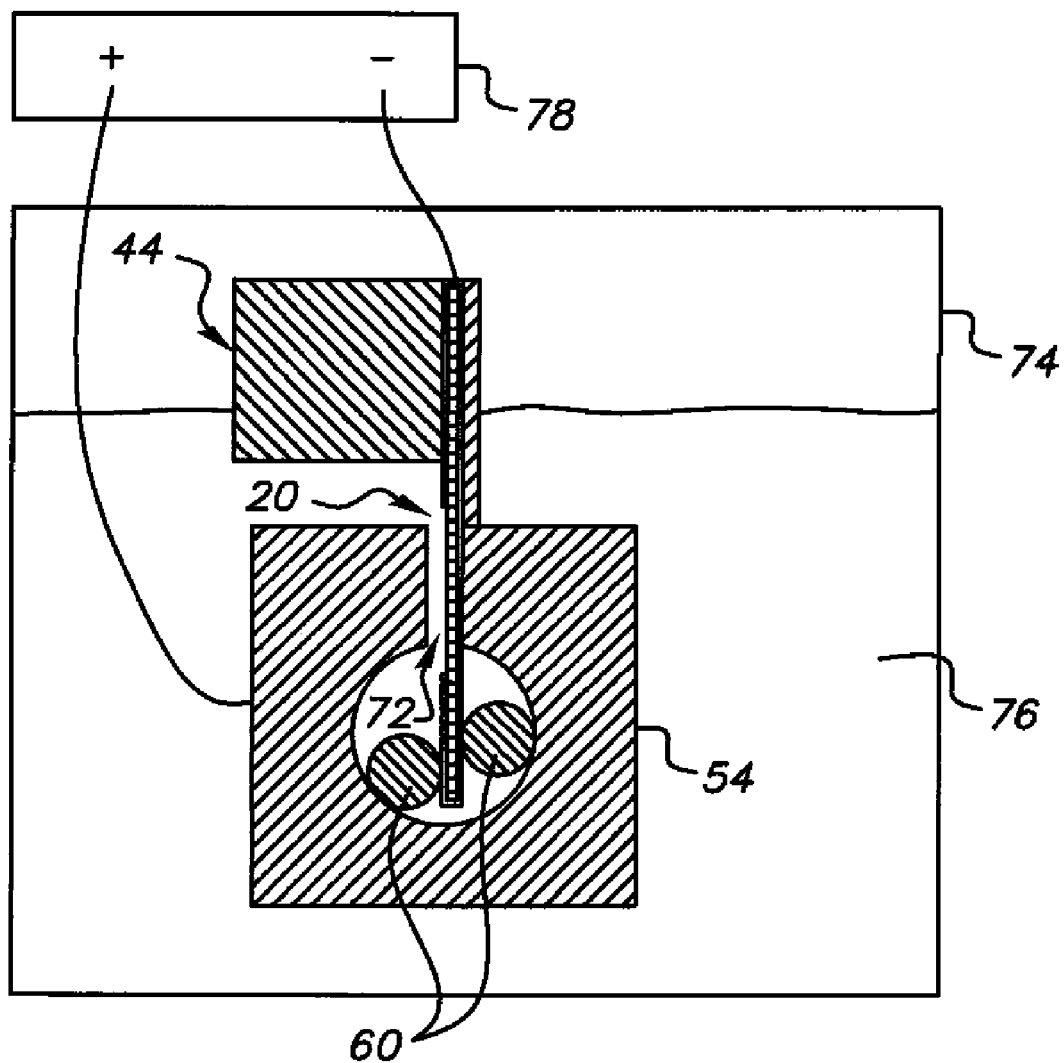
FIG. 7 is a schematic illustration of another example embodiment of the present invention.

Referring to FIG. 7, a schematic illustration of another example embodiment of the present invention is shown. In this embodiment, drop generator body 54, electrode 20, and fixture 44 are immersed in electrolytic fluid 76 contained in a reservoir 74. A power supply 78 in electrical communication with electrode 20 and drop generator body 54 provides the voltage needed for electropolishing fluid passageway 50.

The invention has been described in detail with particular reference to certain preferred embodiments thereof, but it will be understood that variations and modifications can be effected within the scope of the invention.

PARTS LIST

10 Electrode
12 Fluid Cavity
14 Drop Generator Body
16 Fluid Passageway
20 Electrode
22 Ceramic Plate
24 Conductive Layer
26 Face
28 Non-Conductive Face
30 Dielectric Shields
32 Non-Conductive Region
34 Conductive Material
36 Non-Conductive Material
38 Non-Conductive Material
40 Conductive Window
42 Height Of Conductive Window
43 Height Of Wall Of Fluid Passageway
44 Fixture
46 Plate
48 Electrode Mounting Block
50 Fluid Passageway
52 Inkjet Printer Component
54 Drop Generator Body
56 Surface
58 Electrode Guides
60 Rod
62 Fluid Cavity
64 Pump
65 Electrolytic Fluid
66 Reservoir
67 Supply Lines
68 Inlet Ports
70 End Of Drop Generator Body
72 Gap
74 Reservoir
76 Electrolytic Fluid
78 Power Supply

The invention claimed is:

1. A method of manufacturing an inkjet printer component, the inkjet printer component including a fluid passageway, the method further comprising:
   positioning an electrode component in the fluid passageway of the inkjet printer component, the electrode component including a conductive face and a nonconductive face;
   electropolishing a side of the fluid passageway by:
   biasing the nonconductive face of the electrode component toward a first side of the fluid passageway such that the conductive face of the electrode component does not contact any portion of the fluid passageway;
   providing an electrolytic fluid to the fluid passageway of the inkjet printer component;
   applying a voltage between the electrode component and the inkjet printer component; and
   electropolishing a second side of the fluid passageway by:
   biasing the nonconductive face of the electrode component toward the first side of the fluid passageway such that the conductive face of the electrode component does not contact any portion of the fluid passageway;
   providing the electrolytic fluid to the fluid passageway of the inkjet printer component; and
   providing the voltage between the electrode component and the inkjet printer component.

2. A method of manufacturing an inkjet printer component, the inkjet printer component including a fluid passageway, the method comprising:
   positioning an electrode component in the fluid passageway of the inkjet printer component the electrode component including a conductive face and a nonconductive face;
   electropolishing a side of the fluid passageway by:
   biasing the nonconductive face of the electrode component toward a side of the fluid passageway such that the conductive face of the electrode component does not contact any portion of the fluid passageway,
   providing an electrolytic fluid to the fluid passageway of the inkjet printer component; and
   applying a voltage between the electrode component and the inkjet printer component; and
   actively retaining the electrode component in position after biasing the nonconductive face of the electrode component toward the side of the fluid passageway.

3. A method of manufacturing an inkjet printer component, the inkjet printer component including a fluid passageway, the method comprising:
   positioning an electrode component in the fluid passageway of the inkjet printer component, the electrode component having two ends and including a conductive face and a nonconductive face;
   electropolishing a side of the fluid passageway by:
   biasing the nonconductive face of the electrode component toward a side of the fluid passageway such that the conductive face of the electrode component does not contact any portion of the fluid passageway,
   providing an electrolytic fluid to the fluid passageway of the inkjet printer component, and
   applying a voltage between the electrode component and the inkjet printer component; and
   actively retaining both ends of the electrode component in position after biasing the nonconductive face of the electrode component toward the side of the fluid passageway.

4. The method of claim 3, the inkjet printer component including a fluid cavity, wherein actively retaining both ends of the electrode component comprises:
   positioning at least one nonconductive rod in the fluid cavity of the inkjet printer component such that one end of the electrode component is retained in position after biasing the nonconductive face of the electrode component toward the side of the fluid passageway.

* * * * *